Oct. 7, 1969  C. RIDDLE  3,471,697
INSTRUMENT FOR PROVIDING SIGNALS REPRESENTATIVE OF THE
POSITION OF A MOVING TARGET
Filed May 17, 1965  5 Sheets-Sheet 2

Inventor
Cecil Riddle
By
Cushman, Darby & Cushman
Attorneys

Oct. 7, 1969

C. RIDDLE 3,471,697

INSTRUMENT FOR PROVIDING SIGNALS REPRESENTATIVE OF THE
POSITION OF A MOVING TARGET

Filed May 17, 1965

Inventor
Cecil Riddle
By
Cushman, Darby & Cushman
Attorneys

Oct. 7, 1969                C. RIDDLE              3,471,697
INSTRUMENT FOR PROVIDING SIGNALS REPRESENTATIVE OF THE
POSITION OF A MOVING TARGET

Filed May 17, 1965                                     5 Sheets-Sheet 4

Inventor
Cecil Riddle
By
Cushman, Darby & Cushman
Attorneys

Oct. 7, 1969 C. RIDDLE 3,471,697
INSTRUMENT FOR PROVIDING SIGNALS REPRESENTATIVE OF THE
POSITION OF A MOVING TARGET
Filed May 17, 1965 5 Sheets-Sheet 2

Inventor
Cecil Riddle
By
Cushman, Darby & Cushman
Attorneys

United States Patent Office

3,471,697
Patented Oct. 7, 1969

3,471,697
INSTRUMENT FOR PROVIDING SIGNALS REPRESENTATIVE OF THE POSITION OF A MOVING TARGET
Cecil Riddle, Sevenoaks, England, assignor to National Research Development Corporation, London, England
Filed May 17, 1965, Ser. No. 456,345
Claims priority, application Great Britain, May 22, 1964, 21,207/64
Int. Cl. G01t 1/16; H01j 39/00; G01j 1/20
U.S. Cl. 250—83.3                                    9 Claims

ABSTRACT OF THE DISCLOSURE

An optical tracking instrument for producing electrical pulses, the time interval between which is proportional to the offset angle between the target and a fixed reference axis. The instruments include a rotary mirror obliquely mounted with respect to its rotary axis for sweeping a beam from the object field in a conical path, means for focusing the beam on a detector plane, and at least one detector strip radially disposed and intersecting the conical path for producing an electrical target pulse when crossed by the swept image of the object being tracked. In addition, means for producing an electrical reference pulse when the detector is crossed by a point of the swept image representing a pre-determined reference axis in the object field is included. The time interval between the target and reference pulse is then proportional to the offset angle in a plane perpendicular to the detector strip.

This invention relates to optical tracking instruments for locating and tracking moving objects and provides such an instrument which produces an output in the form of electrical pulses, the time interval between which is proportional to the offset angle between the target direction (defined as the line from instrument to moving object) and a reference axis fixed relative to the instrument.

A tracking instrument in accordance with the invention includes a rotary mirror, obliquely mounted with respect to its rotary axis, for sweeping a beam from the object field in a conical path; means for focusing said beam, by way of the rotary mirror, upon a detector plane which intersects the conical path in a circle; at least one detector strip radially disposed with respect to, and intersecting said circle for producing an electrical, target pulse when crossed by the swept image of an object being tracked and means for producing an electrical reference signal when each said detector is crossed by a point of the swept image representing a predetermined reference axis in the object field. The time interval between the target pulse produced by the object and the reference signal is proportional to the offset angle in a plane perpendicular to the detector strip.

In a preferred form, the tracking instrument incorporates a pair of detector strips, intersecting the circle along perpendicular radii, and means for producing a reference signal at the instant when each detector is crossed by the point representing the reference axis. The time intervals between the target pulses and reference signals provide, in this case, two perpendicular coordinate measurements (for example azimuth and elevation) representing the position of the target object relative to the reference axis. The reference axis may, in fact, be any convenient axis which defines a suitable reference position in the object field. It is, however, generally preferred to use the optical axis of the instrument so that the reference position is at the centre of the object field.

The reference signals may be generated in any one of several ways. For some applications it may be satisfactory to use suitably synchronised, electronically generated pulses or pulses derived from pick off means associated with the drive of the rotary mirror. Where a high degree of accuracy is required, however, it is preferred to incorporate in the instrument a small lamp, a beam from which is focused, by way of the rotary mirror, upon a plane in which are situated reference detectors over which the beam is swept to provide the necessary reference signals. This method of generating the reference signals eliminates certain inaccuracies due to possible faults in the optical system and to changes in the speed of rotation of the mirror. The number and arrangement of lamps and detectors used for producing the reference signals will be dictated by convenience and by the requirements of the particular application for which the instrument is used. For some applications it may be possible to use a single lamp in conjunction with the target detectors; for others it may be necessary to use separate detectors and for some it may be necessary or convenient to use a separate lamp/detector combination for each reference signal required.

Certain forms of tracking instrument, in accordance with the invention, will now be more particularly described, by way of example only, with reference to the accompanying drawings in which.

Figure 1:
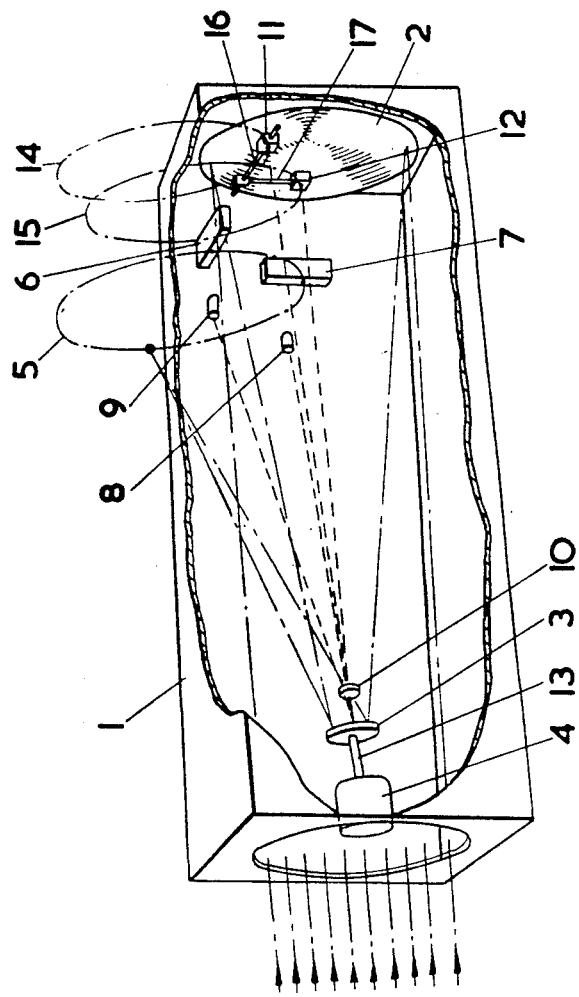
FIG. 1 is a diagrammatic drawing showing one form of instrument.

In the form first to be described, the instrument, intended for tracking an object carrying an infra-red source, incorporates a framework or casing 1 in which is mounted an optical system comprising a parabolic mirror 2 for focusing an image of the object field upon a detector plane; a plane rotary mirror 3, obliquely mounted upon the shaft of a small electric motor 4 for sweeping the image in a circular path 5 upon the detector plane and a pair of detector strips 6, 7 mounted in the detector plane intersecting and radially disposed with respect to the circular path 5 for producing the target pulses. Also mounted in the framework 1 are two small reference lamps 8, 9 the beam from each of which, suitably focused by a lens 10, is swept by the rotary mirror 3 across an associated reference detector 11 or 12 to produce a reference signal. The swept paths of the reference beams are indicated in FIG. 1 by the circular paths 14, 15.

The parabolic mirror 2 is mounted, facing inwardly, at one end of the framework 1 with which it is coaxial, the common axis of mirror 2 and framework 1 constituting the optical axis of the instrument. Near the other end of the framework 1 is mounted the small electric motor 4 whose shaft 13 intersects the optical axis at an acute angle and intersects the plane of the end face in which the parabolic mirror 2 is mounted at a point above and to one side of the axis of that mirror. Mounted obliquely on the motor shaft 13, its centre at the intersection of said shaft with the optical axis, is the circular plane mirror 3 of somewhat smaller diameter than the parabolic mirror 2. An axial beam from the parabolic mirror 2 will thus be swept by the plane mirror 3, as it rotates, in a conical path the angle between whose axis and the optical axis of the parabolic mirror 2 is bisected by the rotary axis of the plane mirror 3. Two long, coplanar infra-red detector strips 6, 7, each consisting of a lead sulphide, multi-element array in conjection with an interference filter for rejecting visible light, are arranged perpendicular to one another and to the rotary axis of the plane mirror 3, their centres lying on the conical path swept by the optical axis of the parabolic mirror 2. One strip 6 is horizontal near the top of the framework 1 and the other, 7, is vertical and to one side of the framework 1, their common plane being at such a position that the length of the optical path thereto from the parabolic mirror 2 is equal to the focal length of that mirror.

Figure 2:
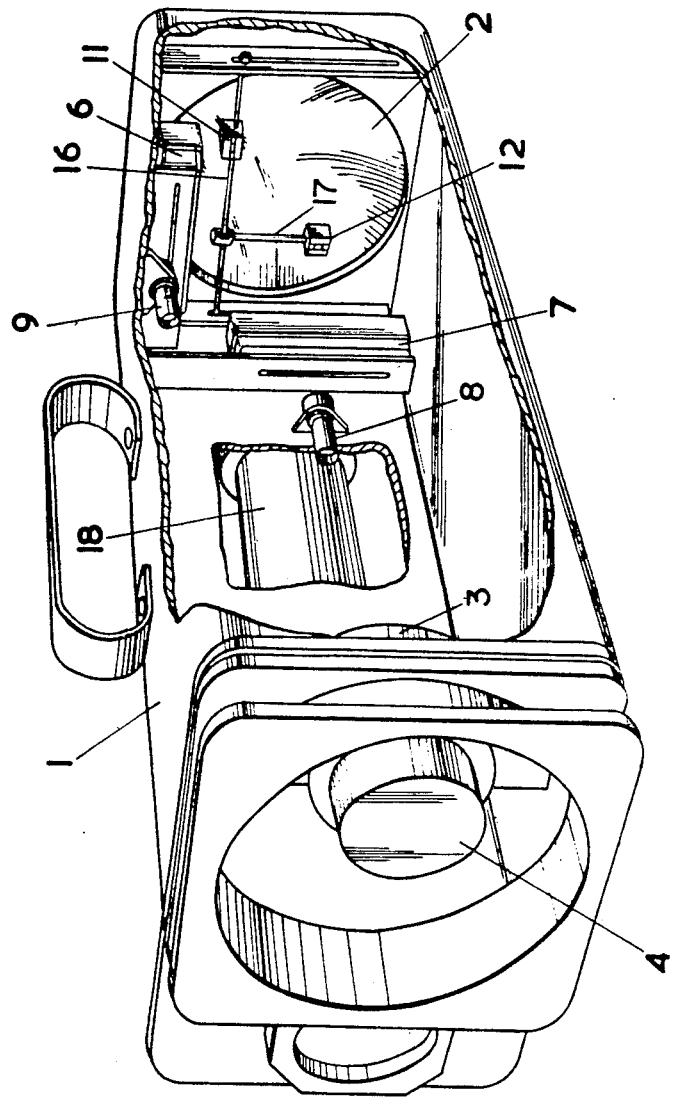
FIG. 2 is a perspective view of the instrument shown in FIG. 1, part of the casing being broken away.
Figure 3:
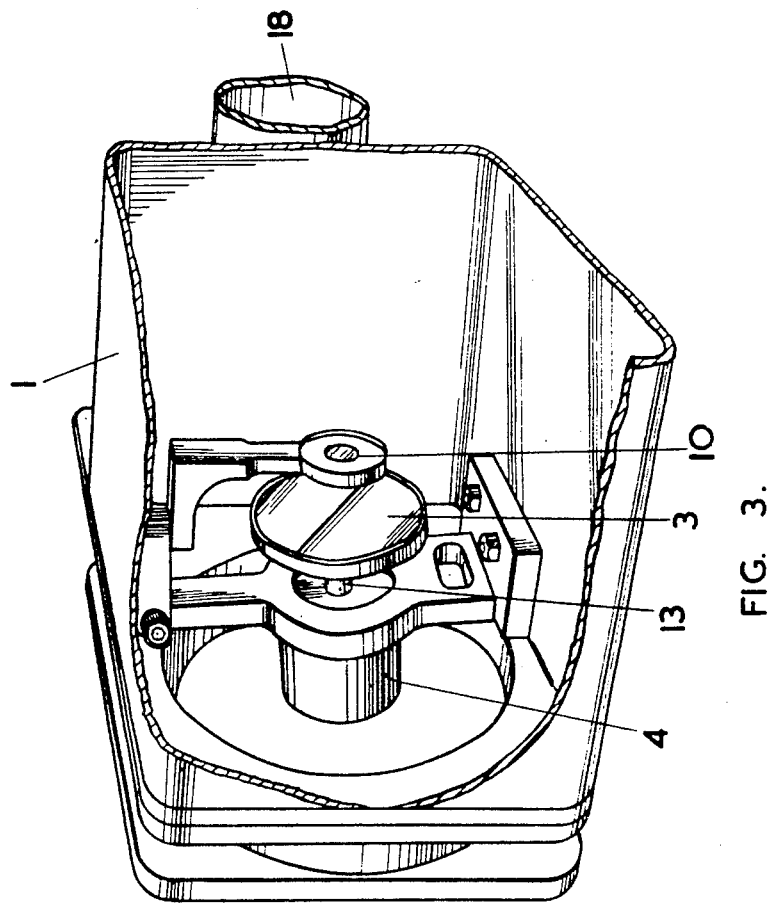
FIG. 3 is a perspective view of part of the instrument shown in FIG. 2 and FIGS. 4 and 5 are diagrammatic drawings of two other forms of instrument.

This instrument uses a separate lamp/detector combination for each of the two required reference signals. Each reference lamp 8 or 9 is mounted near the perimeter of the framework 1, its beam being directed toward the centre of the rotary mirror 3 which sweeps the reflected beam in a conical path. The position of each lamp is chosen so that its beam is not swept over either of the infra-red detectors 6, 7, such a position being easily found by trial. Each beam is suitably focused by a lens 10 placed between the lamp 8 or 9 and the rotary mirror 3, and an associated detector 11 or 12 is located in the path of the swept beam at such a position that a signal is provided therefrom at the instant when the optical axis of the instrument is swept across the corresponding infra-red detector. The reference detectors 11, 12 are slidably mounted on adjustable bars 16, 17 so that each detector is capable of coordinate adjustment. To locate a reference detector correctly the instrument is first aimed at a suitable distant source. The reference detector is then moved until it produces a signal and then further adjusted until the signal coincides in time with that produced as the image of the distant source crosses the corresponding infra-red detector. A final accurate synchronisation is obtained by adjusting the aimed direction of the instrument until the two signals are exactly coincident as indicated by a suitable recording instrument. The same procedure is followed in locating the second lamp and detector. The instrument is now finally set by lining up the crosswires of an attached sighting telescope 18 (FIG. 2) upon the distant source after which the telescope is fixed relative to the instrument.

In operation for tracking an object such as an aircraft, for instance in calibrating an instrument landing system, the instrument is first lined up along the expected or intended flight path. When the instrument is switched on, an image of the object field is swept over the infra-red detectors 6, 7 and reference signals are produced, as described, coincident in time with the passage of the centre of the field across each of these detectors. Target pulses are produced as the image of the aircraft, which carries a suitable infra-red source, crosses the target detectors 6, 7 and these pulses will occur before or after the corresponding reference signals according to whether the aircraft is above or below, to left or right of the reference axis and the time interval between the target pulse and its corresponding reference signal is a measure of the offset of the target from the reference axis and the instrument thus provides coordinates indicative of the aircraft position in azimuth and elevation.

The output may be used in the form of voltage pulses, to trigger an oscilloscope, and beam brighten the trace, which is recorded on cine film to display movement of the aircraft in azimuth and elevation. Alternatively the outputs from each pair of corresponding target and reference detectors may be fed to an electronic circuit which provides an output voltage whose magnitude is proportional to the time interval between target and reference pulses and which is positive or negative depending upon whether the aircraft is above or below the reference axis in elevation and to left or right of the reference axis in azimuth. A suitable circuit for this purpose is described in my co-pending United States application Ser. No. 454,308, filed May 16, 1965 now Patent No. 3,404,344. The output from such a circuit may be used to produce, very quickly, a galvanometer record.

In a modification (FIG. 4) suitable for use where only a small field of view is required, the plane rotating mirror 3 may be omitted, the sweeping over detectors 6a, 7a being carried out by rotating the parabolic mirror 2a which must, of course, be mounted obliquely on the shaft 13a of a motor 4a. This is a simple form of instrument but is limited as to the size of the parabolic mirror 2a and hence as to the field of view. Too large a rotary mirror causes serious vibration in the instrument.

A third modification (FIG. 5), useful if a larger field of view is required, uses a large parabolic mirror 2b to reflect light from the object field onto a stationary, oblique, plane mirror 19, thence to an oblique, rotary, plane mirror 3b and finally onto the detectors 6b, 7b.

Figure 4:
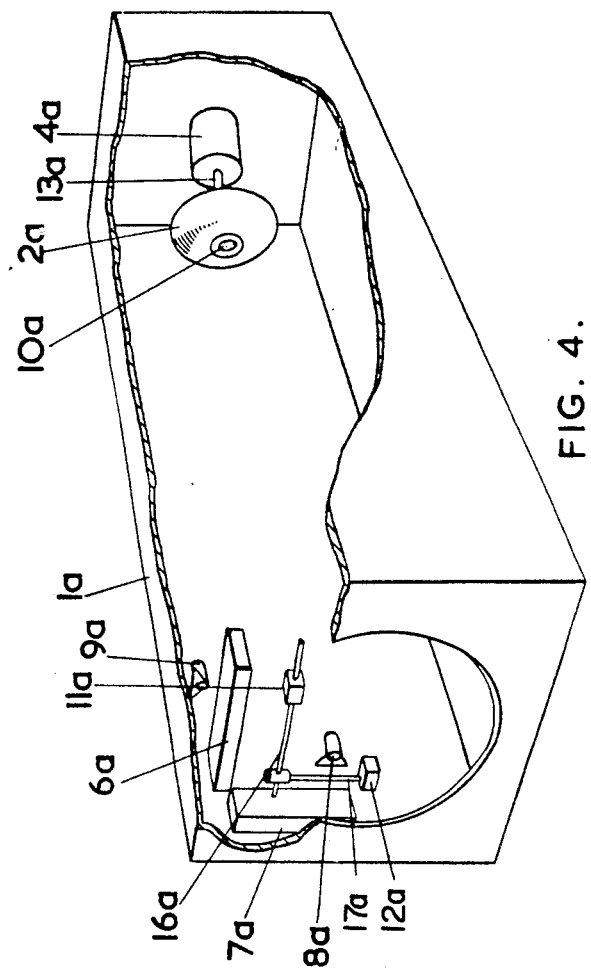
Figure 5:
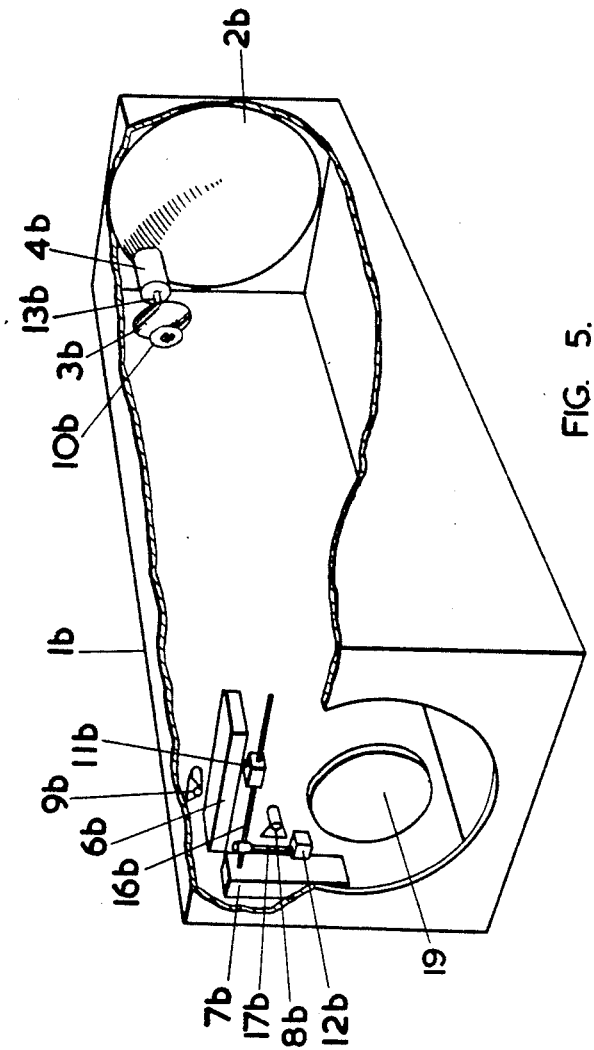

In FIGS. 4 and 5 the target detectors 6a, 7a and 6b, 7b together with the reference lamps 8a, 9a; 8b, 9b and reference detectors 11a, 12a; 11b, 12b are located, in contra-distinction to those of the instrument shown in FIG. 1, at that end of the instrument remote from the parabolic mirror. All the parts shown in FIGS. 4 and 5 which have a counterpart in FIG. 1 have been given the same reference numeral with suffix a or b respectively.

Although it is convenient, in the devices just particularly described, to use separate reference detectors it will be clear that for other applications this may not be necessary. For example visual light may be used to produce the target signals and both signals may be fed to an oscillograph. In such cases one of the alternative arrangements previously referred to may be suitable.

Where a plane rotary mirror is used, as for example, in the device of FIG. 1 or FIG. 5, the beams from the reference lamps may be directed first onto the parabolic mirror and thence to the plane mirror or mirrors before reaching the detectors. This method is slightly more accurate since the reference beam is, like the target beam, passing through the complete optical system. It is, however, not considered necessary for most practical purposes. It is also possible to improve the instrument response by varying the sensitivity of the target detectors along their lengths. For example, when tracking a receding target which is being guided onto a known flight path, the target will often be well off the correct path in the early stages of flight when the range is short and the signal consequently strong, but should be closer to the correct path at longer range. By making the center portion of the detector more sensitive than the outer portions, a wide field of view can be provided when the target is relatively close, coupled with a narrower, highly sensitive field of view when the target is at extreme range.

In some cases it may be possible to use a lens focusing system in place of the parabolic mirror for focusing the target beam. This however, would involve the use of an infra-red lens, such as arsenic trisulphide, for infra-red transmission and for most purposes the parabolic mirror is preferred.

In some applications it may be desirable, in order to provide an accurate calibration of the time interval/offset distance relationship, to provide an additional external reference marker. For this purpose, a marker lamp is mounted in a predetermined calibration plane through which the target object will pass and at a known distance from the instrument reference axis, in order to generate a marker signal as its image is swept over the detector. It is preferred to incorporate in the circuitry an electronic sequential switching arrangement, which may be of a known type, whereby the target and marker signals respectively are recorded at alternate rotations of the rotary mirror. Preferably two marker lamps are provided at a known distance apart with means, such as a photoelectric device, for switching from one to the other as the target object passes through the calibration plane. This system gives an accurate calibration at the predetermined plane since a definite measurement on the record corresponds to an accurately known offset distance defined by the marker lamp or lamps.

Under certain conditions it has been found that spurious signals may be obtained due to the sweeping across a detector strip of edges in the object field, parallel to the length of the detector strip, at which a considerable change in light intensity occurs (for example the wall or roof line of a building). Using detector strips built up of a series of end to end sections, this effect can be eliminated by feeding the output from alternate sections to two separate channels of a circuit arranged to cancel signals occurring simultaneously in both its channels.

I claim:

1. A tracking instrument comprising a rotary mirror obliquely mounted with respect to its rotary axis, for sweeping a beam from an object field in a conical path; means for rotating the mirror; focusing means for focusing the said beam, by way of the rotary mirror, upon a selected detector plane which intersects the conical path in a circle; at least one detector strip mounted in the detector plane substantially radially disposed so as to intersect the said circle for producing an electrical target pulse when crossed by the swept image of an object being tracked; and means for producing an electrical reference signal incorporating at least one reference lamp for directing a reference beam onto the rotary mirror, to be swept thereby in a conical path, and a detector so located that it is crossed by the swept reference beam to produce a reference signal at the instant when each said detector strip is crossed by a point of the swept image of the object field representing a pre-determined reference axis in that field; the time interval between the target pulse and the reference signal being proportional to the offset angle between the target direction and the reference axis measured in a plane perpendicular to the detector strip.

2. A tracking instrument as claimed in claim 1 wherein the focusing means comprises a parabolic mirror.

3. A tracking instrument as claimed in claim 1 incorporating two detector strips mounted in the detector plane, said strips being disposed, respectively, along two mutually inclined radii of, and intersecting the circumference of the circle in which said detector plane is intersected by the conical path of the swept beam from the object field; and means for producing a reference signal at the instant when each detector strip is crossed by the point representing the reference axis, the time intervals between the respective target pulses and their corresponding reference signals being proportional to the offset angles measured in the planes perpendicular to the respective detector strips.

4. A tracking instrument as claimed in claim 3 wherein the detector strips are disposed respectively along two mutually perpendicular radii of the said circle.

5. A tracking instrument as claimed in claim 1 incorporating, for each reference signal required, a reference lamp for directing a reference beam onto the rotary mirror to be swept thereby in a conical path; and a reference detector, distinct from the target detector strips, located in the swept path of the reference beam for producing a reference signal when crossed hereby; the orientation of said reference detector about the axis of the conical path of the reference beam being such that the reference signal occurs at the instant when the point representing the reference axis crosses a corresponding detector strip.

6. A tracking instrument as claimed in claim 1 wherein each detector strip is an infra-red sensitive detector for producing signals from a target object which incorporates an infra-red source.

7. A tracking instrument comprising a frame open at one end; an inwardly facing parabolic mirror mounted, coaxially with the frame, at its closed end; a shaft mounted at the open end of the frame and inclined at an acute angle to the axis of the parabolic mirror; a rotary plane mirror mounted obliquely on the shaft, its reflecting face toward the parabolic mirror whose axis passes through its centre; an electric motor for rotating the rotary mirror whereby a parallel beam from an object field, entering the open end of the frame, is focused by the parabolic mirror, by way of the rotary mirror, upon a transverse plane of the frame constituting a detector plane and is swept by the rotary mirror in a conical path which intersects said detector plane in a circle; a pair of detector strips mounted on the frame in said detector plane, intersecting said circle and disposed, respectively, along a vertical and a horizontal radius thereof, each of which detector strips will produce a target pulse when crossed by the swept image of a target object in the object field; two reference lamps mounted on the frame; means for directing a reference beam from each lamp onto the rotary mirror to be swept thereby in a conical path, the lamps being so located that neither of the conical paths of the reference beams intersects either of the aforesaid detector strips; two reference detectors mounted on the frame, one located in the conical path of each reference beam, for producing an electrical reference signal when swept over thereby and a lens mounted in front of the rotary mirror for focusing the reference beams upon the reference detectors; each reference detector being associated with one of the detector strips and being so located in the swept path of its associated reference beam that its reference signal is produced at the instant when its associated detector strip is crossed by a point of the swept image of the object field representing a predetermined axis in the object field, whereby the time intervals between the respective target pulses and their associated reference signals are proportional to the offset angles between the target direction and the reference axis measured in the planes perpendicular to the respective detector strips.

8. A tracking instrument comprising a frame open at one end; a shaft mounted at the closed end of the frame and inclined at an acute angle to its axis; a rotary parabolic mirror mounted obliquely on the shaft, its reflecting face toward the open end of the frame; an electric motor for rotating the rotary parabolic mirror whereby a parallel beam from an object field, entering the open end of the frame is focused by the parabolic mirror upon a transverse plane of the frame constituting a detector plane and, at the same time, is swept, as the mirror rotates, in a conical path which intersects the said detector plane in a circle; a pair of detector strips mounted on the frame in said detector plane, intersecting said circle and disposed, respectively, along a vertical and a horizontal radius thereof, each of which detector strips will produce a target pulse when crossed by the swept image of a target object in the object field; two reference lamps mounted on the frame; means for directing a reference beam from each lamp onto the rotary mirror to be swept thereby in a conical path, the lamps being so located that neither of the conical paths of the reference beams intersects either of the aforesaid detector strips; two reference detectors mounted on the frame, one located in the conical path of each reference beam, for producing an electrical reference signal when swept over thereby and a lens mounted in front of the rotary mirror for focusing the reference beams upon the reference detectors; each reference detector being associated with one of the detector strips and being so located in the swept path of its associated reference beam that its reference signal is produced at the instant when its associated detector strip is crossed by a point of the swept image of the object field representing a predetermined axis in the object field, whereby the time intervals between the respective target pulses and their associated reference signals are proportional to the offset angles between the target direction and the reference axis measured in the planes perpendicular to the respective detector strips.

9. A tracking instrument comprising a frame open at one end; and inwardly facing parabolic mirror mounted, coaxially with the frame, at its closed end; a fixed plane mirror obliquely athwart the axis of the parabolic mirror at the open end of the frame, whereby an axial beam from the parabolic mirror will be reflected back obliquely along the frame; a shaft mounted near the closed end of the frame intersecting and inclined to the axis of the reflected beam from the fixed plane mirror; a rotary plane mirror mounted obliquely on said shaft its reflecting face toward the fixed plane mirror and its centre of rotation on the axis of the said reflected beam; an electric motor for rotating the rotary mirror whereby a parallel beam from an object field, entering the open end of the frame, is focused by the parabolic mirror, by way of the fixed and rotary plane mirrors, upon a transverse plane of the frame constituting a detector plane and is swept by the rotary mirror in a conical path which intersects said detector plane in a circle; a pair of detector strips mounted on the frame in said detector plane, intersecting said circle and disposed, respectively, along a vertical and a horizontal radius thereof, each of which detector strips will produce a target pulse when crossed by the swept image of a target object in the object field; two reference lamps mounted on the frame; means for directing a reference beam from each lamp onto the rotary mirror to be swept thereby in a conical path, the lamps being so located that neither of the conical paths of the reference beams intersects either of the aforesaid detector strips; two reference detectors mounted on the frame, one located in the conical path of each reference beam, for producing an electrical reference signal when swept over thereby and a lens mounted in front of the rotary mirror for focusing the reference beams upon the reference detectors; each reference detector being associated with one of the detector strips and being so located in the swept path of its associated reference beam that its reference signal is produced at the instant when its associated detector strip is crossed by a point of the swept image of the object field representing a predetermined axis in the object field, whereby the time intervals between the respective target pulses and their associated reference signals are proportional to the offset angles between the target direction and the reference axis measured in the planes perpendicular to the respective detector strips.

References Cited

UNITED STATES PATENTS

| | | |
|---|---|---|
| 3,237,010 | 2/1966 | Elliott et al. |
| 3,349,244 | 10/1967 | Briggs et al. |
| 3,357,298 | 12/1967 | Beal _____ 250—203 X |

RALPH G. NILSON, Primary Examiner

SAUL ELBAUM, Assistant Examiner

U.S. Cl. X.R.

88—1; 250—203